(12) United States Patent
Disantis et al.

(10) Patent No.: US 7,955,037 B2
(45) Date of Patent: Jun. 7, 2011

(54) FASTENER ASSEMBLY

(75) Inventors: Raymond Disantis, Willowick, OH (US); Lance Clark Bellows, Concord Township, OH (US)

(73) Assignee: Universal Metal Products, Inc., Wickliffe, OH (US)

(*) Notice: Subject to any disclaimer, the term of this patent is extended or adjusted under 35 U.S.C. 154(b) by 715 days.

(21) Appl. No.: 11/838,640

(22) Filed: Aug. 14, 2007

(65) Prior Publication Data

US 2007/0280802 A1 Dec. 6, 2007

Related U.S. Application Data

(63) Continuation-in-part of application No. 11/084,926, filed on Mar. 21, 2005, now Pat. No. 7,270,509.

(60) Provisional application No. 60/555,249, filed on Mar. 22, 2004, provisional application No. 60/568,963, filed on May 7, 2004.

(51) Int. Cl.
*F16B 39/32* (2006.01)

(52) U.S. Cl. .......................... 411/330; 411/332; 411/149

(58) Field of Classification Search .................. 411/149, 411/150, 330, 332, 202, 240, 949, 950
See application file for complete search history.

(56) References Cited

U.S. PATENT DOCUMENTS

| | | | |
|---|---|---|---|
| 292,063 A * | 1/1884 | Shailer | 411/144 |
| 588,346 A * | 8/1897 | Mireault | 411/330 |
| 588,863 A | 8/1897 | Harry | |
| 666,065 A | 1/1901 | Oliver | |
| 961,371 A | 6/1910 | Posey | |
| 968,171 A * | 8/1910 | Lodge | 411/218 |
| 1,057,209 A | 3/1913 | Andrews | |
| 1,088,253 A | 2/1914 | Armstrong | |
| 1,166,736 A | 1/1916 | Bailey | |
| 1,246,353 A | 11/1917 | Thigpen | |

(Continued)

FOREIGN PATENT DOCUMENTS

FR 1 026 339 4/1953

OTHER PUBLICATIONS

Nord-Lock Bolt Securing System, The bolt becomes self-locking, Internet website www.nord-lock.com.

(Continued)

*Primary Examiner* — Flemming Saether
(74) *Attorney, Agent, or Firm* — Fay Sharpe LLP

(57) ABSTRACT

A fastener assembly includes a threaded bolt and a locking nut assembly. The threaded bolt includes at least one longitudinal groove. The locking nut assembly includes a nut adapted to threadingly engage the bolt, a locking ring adapted to engage the bolt and the nut, and a biasing member adapted to bias the locking ring. The nut includes a threaded bore dimensioned to receive the bolt and can include a plurality of teeth formed on a face of the nut. Alternatively, an insert ring can be received by the nut and the insert ring can include teeth. The locking ring includes at least one inwardly protruding tab dimensioned to be received by the at least one longitudinal groove of the threaded bolt and a plurality of teeth formed on a face of the ring. The teeth on the face of the locking ring cooperate with the teeth on the face of the nut, or insert ring, to inhibit removal of the nut from the bolt after the nut has been tightened.

13 Claims, 19 Drawing Sheets

U.S. PATENT DOCUMENTS

| | | | | |
|---|---|---|---|---|
| 1,377,696 | A | * | 5/1921 | Kronberg ..................... 411/326 |
| 1,403,902 | A | | 1/1922 | Fields |
| 1,509,948 | A | | 9/1924 | Hall |
| 1,622,581 | A | | 3/1927 | Gunkel |
| 2,152,977 | A | | 4/1939 | Schindel |
| 2,966,187 | A | | 12/1960 | Ter Cock |
| 2,997,090 | A | | 8/1961 | Anderson |
| 3,866,878 | A | | 2/1975 | Yamamoto |
| 4,971,501 | A | | 11/1990 | Chavez |
| 5,190,423 | A | * | 3/1993 | Ewing ........................... 411/134 |
| 6,082,941 | A | | 7/2000 | Dupont et al. |
| 6,434,792 | B1 | | 8/2002 | Williamson |
| 6,976,817 | B1 | | 12/2005 | Grainger |
| 2003/0152439 | A1 | | 8/2003 | Hartmann et al. |

OTHER PUBLICATIONS

Permanentech, Permanentech Introduces Tine Lok Vibration-Proof, Self-Locking Fastening System, Internet website www.permanentech.com.

* cited by examiner

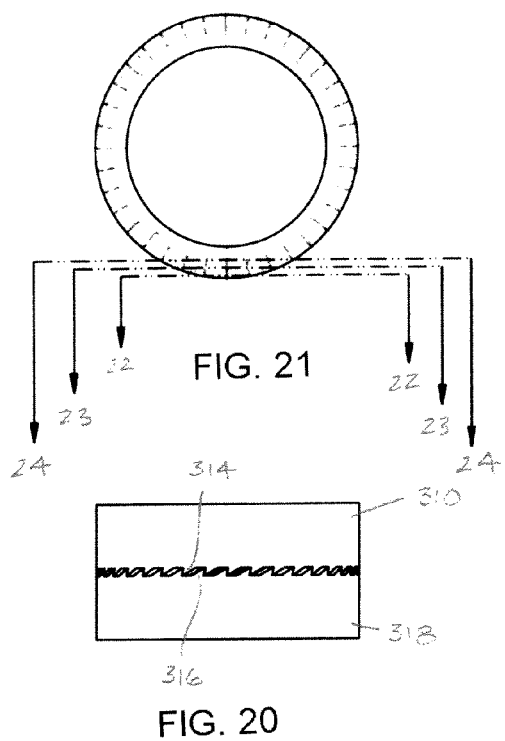
FIG. 21
FIG. 20
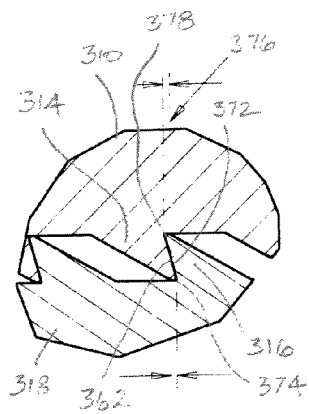
FIG. 22
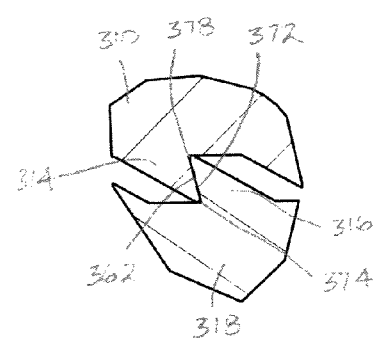
FIG. 23
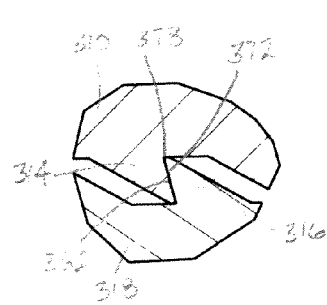
FIG. 24

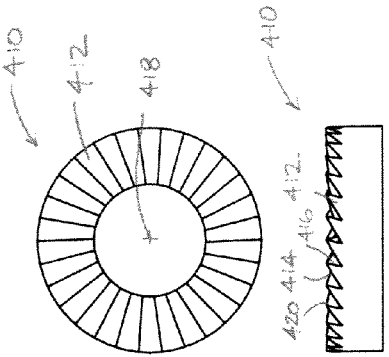
FIG. 27
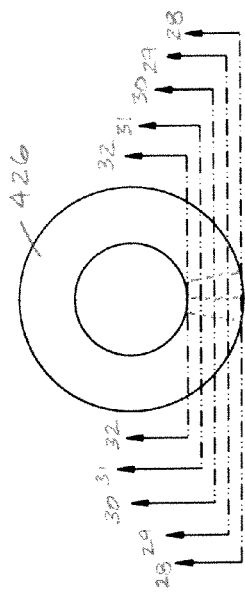
FIG. 25
FIG. 26
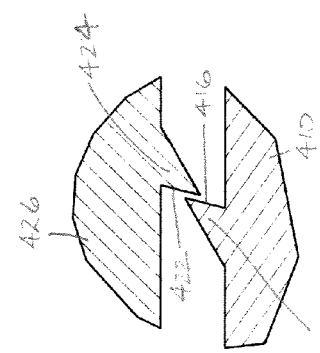
FIG. 28
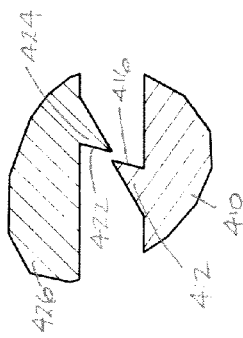
FIG. 31
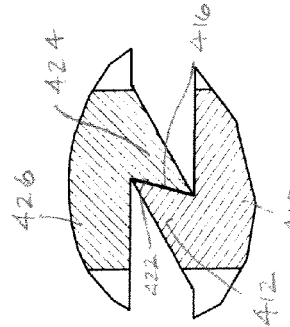
FIG. 29
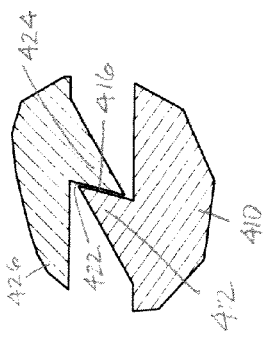
FIG. 32
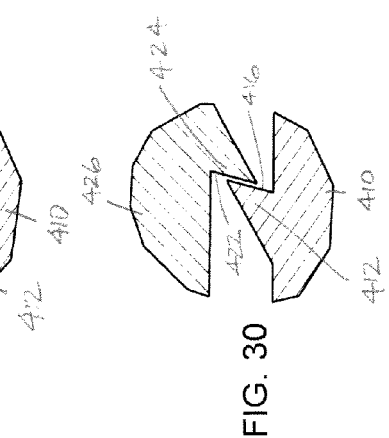
FIG. 30

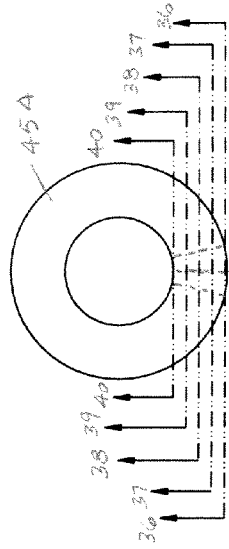
FIG. 35
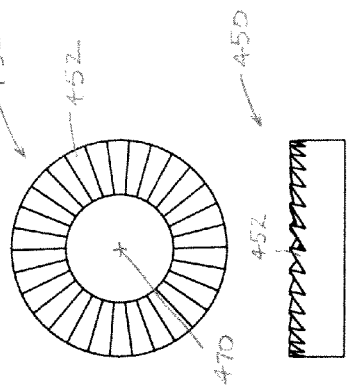
FIG. 33
FIG. 34
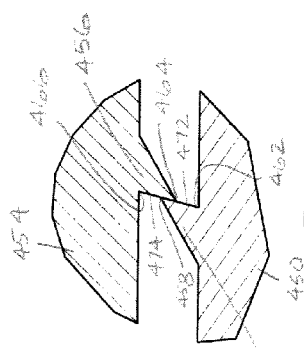
FIG. 39
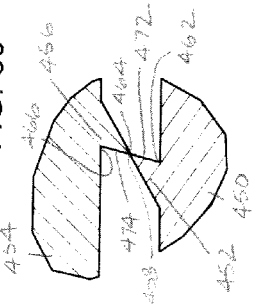
FIG. 40
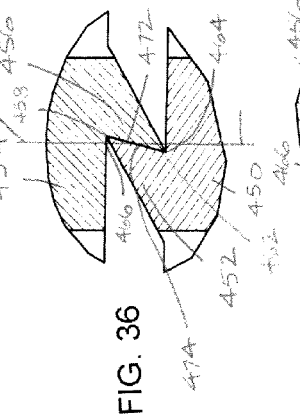
FIG. 36
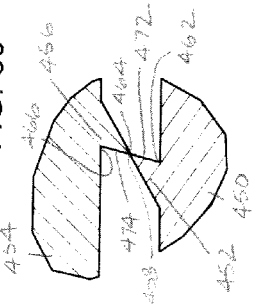
FIG. 37
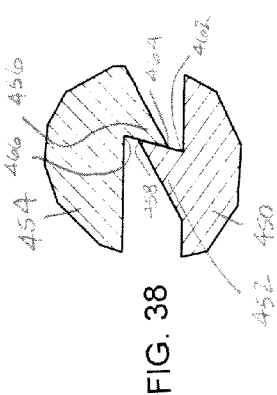
FIG. 38

FASTENER ASSEMBLY

This application is a continuation-in-part application of U.S. patent application Ser. No. 11/084,926, filed Mar. 21, 2005, which claims priority to Provisional Patent Application Ser. No. 60/555,249, filed Mar. 22, 2004 and Provisional Patent Application Ser. No. 60/568,963, filed May 7, 2004, each of which is incorporated by reference herein in its entirety.

BACKGROUND

A need exists for threaded fasteners that can withstand vibration cycling with minimum loss of clamping force, i.e., axial load. It is also desirable to provide a fastener having a removal torque that matches or exceeds an installation torque. Such a fastener reduces the effects of tampering.

Known self-locking fasteners that inhibit removal of a tightened nut from a threaded bolt allow the bolt to be rotated as much as 40 degrees before the nut engages so that it no longer rotates. It has been found that a ⅜" diameter bolt with 16 threads per inch that secures two ½" plates, so that the length of the bolt under a clamp load is 1", loses two-thirds of its load on the plates when rotated about 12 degrees in an untightening direction. With the known self-locking fasteners, the bolt and nut may still be retaining the plates after the nut has been rotated 40 degrees in the untightening direction; however, the bolt has lost its load and no longer retains the plates tightly.

Other self-locking fastener assemblies use teeth that engage one another to limit rotational movement of the nut with respect to the bolt. The bolt engages a locking ring that has a plurality of teeth formed on a face that is normal to the longitudinal axis of the bolt. A nut that is threaded onto the bolt also includes a face having a plurality of teeth that engage the teeth of the locking ring. In known assemblies, however, the teeth in the locking ring and the teeth on the bolt are disposed at a positive rake angle in the untightening direction and in the tightening direction. That is, the apex of each tooth follows the point where the base joins the face for each tooth in both the tightening and the untightening rotational direction. Such a configuration allows the teeth of the nut to ramp over the teeth of the locking ring when one attempts to remove the nut. Such movement is undesirable.

SUMMARY

A fastener assembly includes a threaded bolt, locking nut assembly and a spring. The threaded bolt includes a longitudinal groove. The locking nut assembly includes a first component including a threaded bore for threading onto the bolt and a second component including an unthreaded bore for receiving the bolt and including a tab received by the longitudinal groove so that rotation of the bolt results in rotation of the second component. The locking nut assembly also include a first plurality of teeth formed around the threaded bore and fixed for rotational movement with the first component. Each first tooth has a first tooth apex spaced from a first tooth root in a direction parallel to a rotational axis of the first component. Each first tooth has a first tooth trailing edge disposed at a rake angle less than or equal to zero degrees and each first tooth has a substantially constant first tooth width dimension measured between the first tooth trailing edge and the first tooth leading edge along cross sections taken perpendicular to the first tooth trailing edge. The first tooth trailing edges of adjacent first teeth are spaced less than ten degrees from one another. The locking nut assembly also includes a second plurality of teeth formed around the unthreaded bore and fixed for rotational movement with respect to the second component. Each second tooth has an apex spaced from a second tooth root in a direction parallel to a rotational axis of the second component. The second teeth project in a direction opposite to the direction in which the first plurality of teeth project. Each second tooth has a second tooth trailing edge disposed at a rake angle less than or equal to zero degrees. Each second tooth has a substantially constant second tooth width dimension measured between the second tooth trailing edge and a second tooth leading edge along cross sections taken perpendicular to the second tooth trailing edge. The spring biases the first plurality of teeth towards the second plurality of teeth.

In another embodiment, the fastener assembly includes a threaded bolt, a nut, a locking ring and a biasing member. The threaded bolt includes a groove formed in threads of the bolt extending in a direction parallel to the rotational axis of the bolt. The nut includes a threaded bore for threading the nut onto the bolt and a plurality of nut teeth formed on a face around the threaded bore and protruding from the face in a direction parallel to a rotational axis of the nut. At each cross section taken through each nut tooth normal to a radius emanating from the nut's rotational axis each intersection of a nut tooth trailing edge and the face is offset from the radius in a direction perpendicular to the radius and each nut tooth trailing edge is disposed at a rake angle less than or equal to zero degrees. The locking ring includes a locking ring bore, an inward extending tab received in the groove of the bolt and a plurality of locking ring teeth formed on a surface around the locking ring bore for engaging the nut teeth. The locking ring teeth protrude from the surface in a direction parallel to a rotational axis of the locking ring. At each cross section taken through the locking ring teeth normal to a radius emanating from the locking ring's rotational axis each intersection of a locking ring tooth trailing edge and the surface is offset from a radius emanating from the locking ring's rotational axis in a direction perpendicular to the radius and each locking ring tooth trailing edge being disposed at a rake angle less than or equal to zero degrees. The biasing member biases the nut towards the locking ring.

In yet another alternative embodiment, the fastener assembly includes a threaded bolt, a nut, a first ring, a second ring, and a biasing member. The threaded bolt includes a longitudinal groove. The nut includes a threaded bore for threading the nut onto the bolt. The nut also includes a counterbore coaxial with the threaded bore and a longitudinal recess radially offset from the counterbore. The first ring is received in the counterbore. The first ring includes a longitudinal protuberance received in the longitudinal recess. The first ring also includes a first ring bore extending through the first ring. The first ring also includes a plurality of first teeth formed on a face around the first ring bore and protruding from the face in a direction parallel to a rotational axis of the first ring. At each cross section taken through each first tooth normal to a first ring radius emanating from the first ring's rotational axis each intersection of a first ring tooth trailing edge and the face being offset from the first ring radius in a direction perpendicular to the first ring radius. Each first tooth trailing edge being disposed at a rake angle less than or equal to zero degrees and each first tooth including an outer chamfered edge. The second ring is also received in the counterbore and includes a second ring bore extending through the second ring. The second ring also includes an inward extending tab received in the groove of the bolt and a plurality of second teeth formed on a surface around the second ring bore for engaging the first ring teeth. The second ring teeth protrude from the surface in a direction parallel to a rotational axis of the second ring. At each cross section taken through the second ring teeth normal to a second ring radius emanating from the second ring's rotational axis each intersection of a second ring tooth trailing edge and the surface being offset from the second ring radius in a direction perpendicular to the second ring radius. Each second ring tooth trailing edge is disposed at a rake angle less than or equal to zero degrees. Each second tooth including an outer chamfered edge. The biasing member biases the second ring towards the first ring.

BRIEF DESCRIPTION OF THE DRAWINGS

FIG. 20 is a schematic elevation view of the insert ring engaged of FIG. 16 engaging the interlocking ring of FIG. 17.

FIG. 21 a top plan view of FIG. 20.

FIGS. 22-24 are cross-sectional views taken in FIG. 21, the cross sections being taken along the line that corresponds to the figure number.

FIG. 25 is a plan view of a known locking ring design.

FIG. 26 is a side elevation view of FIG. 25.

FIG. 27 is a plan view of an upper interlocking ring engaging a lower interlocking ring with only one tooth shown in hidden lines for clarity.

FIGS. 28-32 are cross-sectional views taken through FIG. 27, the cross sections being taken along the line that corresponds to the figure number.

FIG. 33 is a top plan view of an alternative embodiment of a ring, which can be an insert ring or an interlocking ring.

FIG. 34 is a side elevation view of FIG. 33.

FIG. 35 is a top plan view of an upper ring engaging a lower ring with only one tooth shown for clarity.

FIGS. 36-40 are cross sections taken through the interlocking rings shown in FIG. 35, the cross sections being taken along the line that corresponds to the figure number.

DETAILED DESCRIPTION

Figure 1:
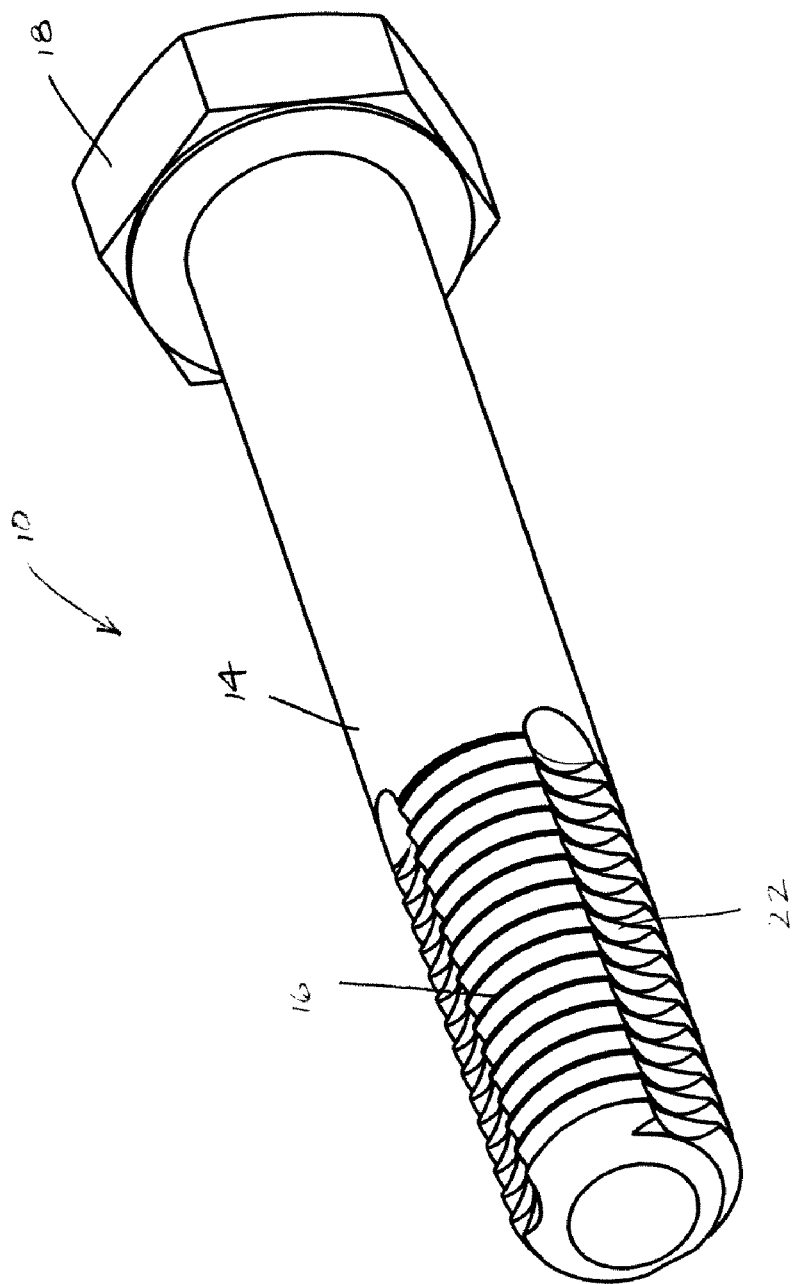
FIG. 1 is a perspective view of a bolt for use with a locking nut assembly.
Figure 2:
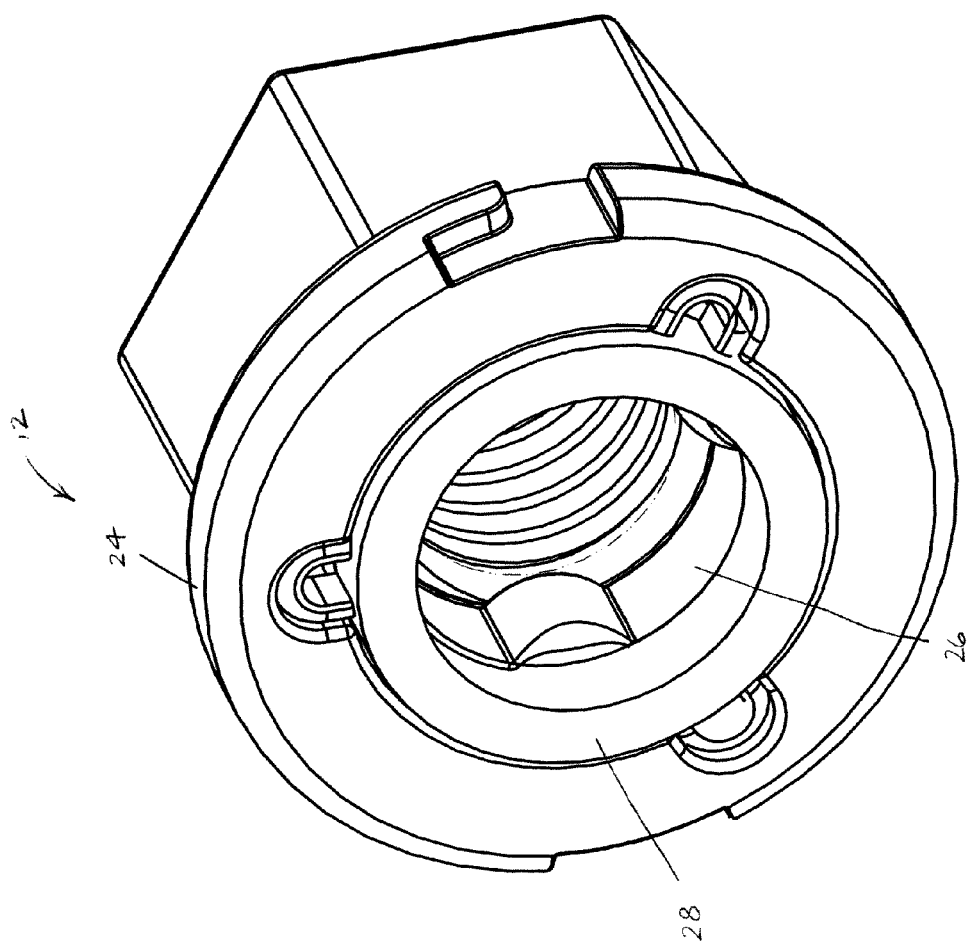
FIG. 2 is a perspective view of a locking nut assembly for use with the bolt of FIG. 1.

With reference to FIGS. 1 and 2, a self-locking fastener assembly includes a bolt 10 (FIG. 1) and a nut locking assembly 12 (FIG. 2). The bolt 10 includes a shank 14 having threads 16. The shank 14 extends from a bolt head 18. Longitudinal grooves 22 that run parallel to a longitudinal (rotational) axis of the bolt 10 are roll formed or cut just below the minor diameter of the threads 16. Even though it is not shown, the threads 16 and the longitudinal grooves 22 can run the entire length of the shank 14. The fastener 10 can be made from conventional materials such as hardened steel, titanium and the like.

Figure 3:
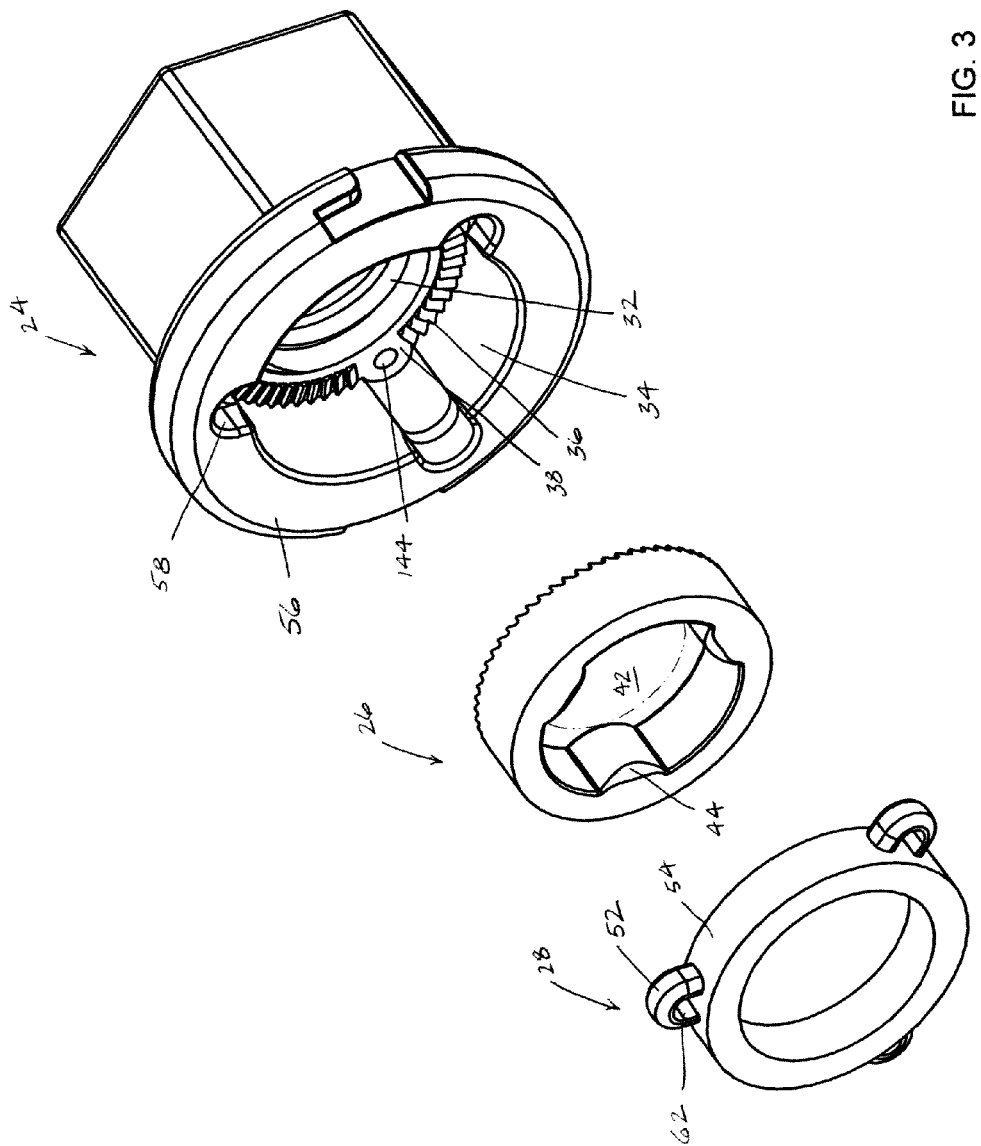
FIG. 3 is an exploded perspective view of the locking nut assembly of FIG. 2.

The nut locking assembly 12 shown in FIG. 2 is received on the bolt 10. The nut locking assembly 12 includes a nut 24, an interlocking ring 26, and a biasing member 28. With reference to FIG. 3, the nut 24 includes a threaded bore 32 that is configured to received the threaded portion of the bolt 10. The nut 24 also includes a counterbore 34 that is coaxial with the threaded bore 32 and is dimensioned to receive the interlocking ring 26 and the biasing member 28, as seen in FIG. 2. The counterbore has a depth equal to or slightly less than the thickness of the interlocking ring 26 and the biasing member 28 so that the biasing member extends from the counterbore. A plurality of teeth 36 are formed on a recessed base 38 at the bottom of the counterbore 34. The recessed face 38 is substantially normal to a longitudinal (rotational) axis of the nut 24 and the teeth 36 extend upwardly from the recessed face in a direction generally aligned with the longitudinal axis. The teeth 36 are formed having a negative rake, which will be described in more detail below.

Figure 4:
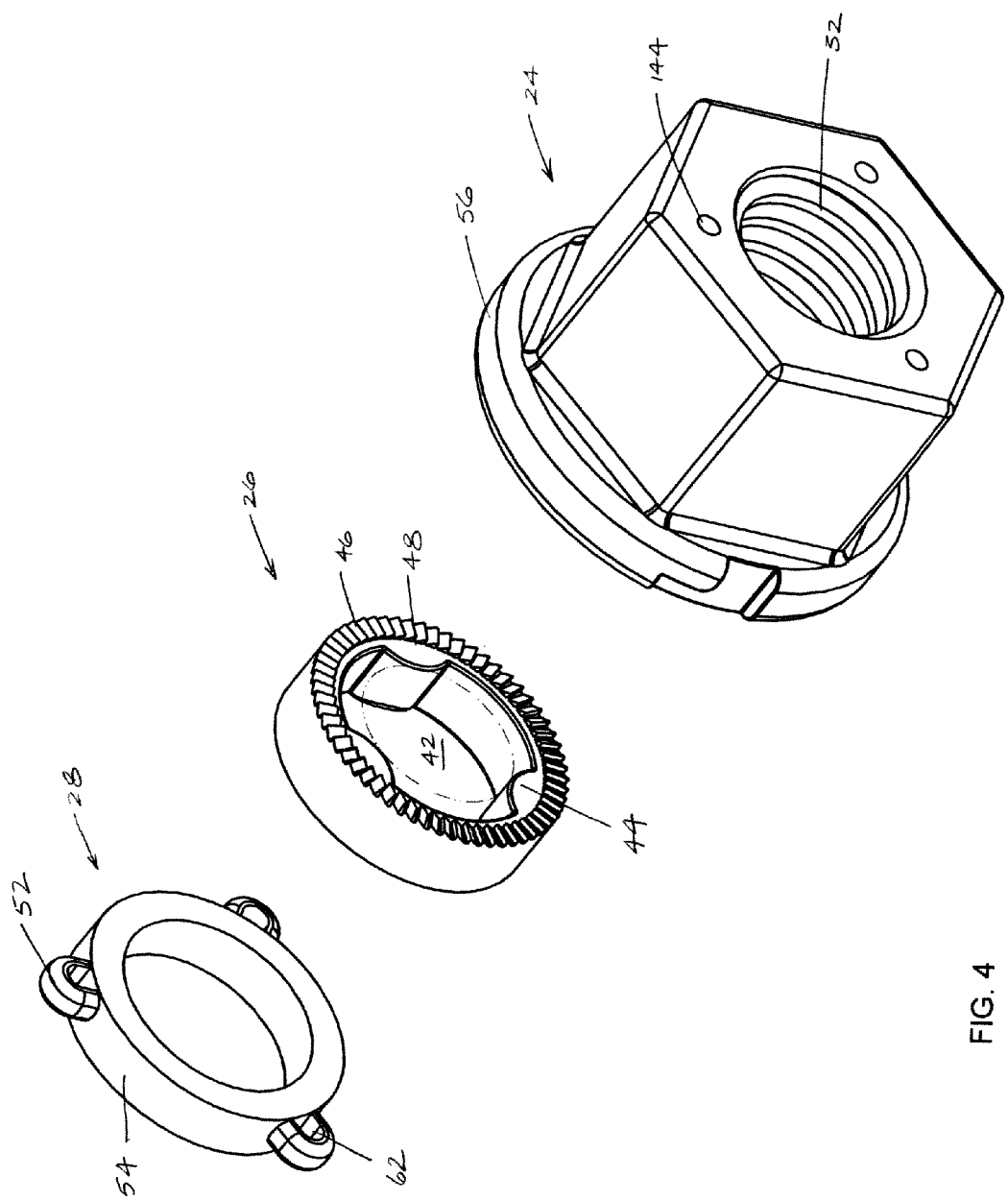
FIG. 4 is an exploded perspective view, opposite the view of FIG. 3, of the locking nut assembly of FIG. 2.

The interlocking ring 26 includes a central opening 42 that is dimensioned to receive the bolt 10 (FIG. 1). Even though the interlocking ring takes the form of a continuous circular band, the interlocking ring can have other configurations that are not continuous. The interlocking ring includes a plurality of inwardly extending tabs 44 that are dimensioned to be received by the longitudinal grooves 22 of the bolt 10 (FIG. 1). The tabs 44 engage the longitudinal grooves 22 so that rotation of the bolt 10 results in rotation of the interlocking ring 26. As more clearly seen in FIG. 4, the interlocking ring 26 includes a plurality of teeth 46 formed on a face 48 of the interlocking ring. The teeth 46 of the interlocking ring 26 selectively engage the teeth 36 of the nut 24, which will be described in more detail below.

The biasing member 28 includes outwardly extending fingers 52 that extend radially from a peripheral edge 54 of the biasing member 28. In the embodiment depicted, the biasing member 28 is made of an elastomeric material, such as Viton, FEP, or Santoprene®. The biasing member 28 can be dimensioned to snugly fit inside the counterbore 34 (FIG. 3) of the nut 24. The counterbore 34 can limit the tendency for the biasing member 28 to flatten out as an axially load is applied to the biasing member. As more clearly seen in FIG. 3, the nut 24 includes an annular shoulder 56 having a plurality of recesses 58 extending radially into the shoulder. Since the counterbore 34 will typically be manufactured with a draft angle, the recesses 58 are shaped to receive the fingers 52 of the biasing member 28 to retain the interlocking ring 26 inside the counterbore 34. The fingers 52 can also define openings 62 between the peripheral edge 54 of the biasing member 28 and the finger 52. The openings 62 allow the fingers 52 to deflect inwardly, i.e. toward the radial centerline of each opening 62, so that when pressed into the recesses 58 the fingers can exert an outward force to retain the interlocking ring 26 inside the counterbore 34. Also, glue or other adhesive can be dispensed into the openings 62 to further retain the biasing member 28 in the counterbore 34.

Figure 5:
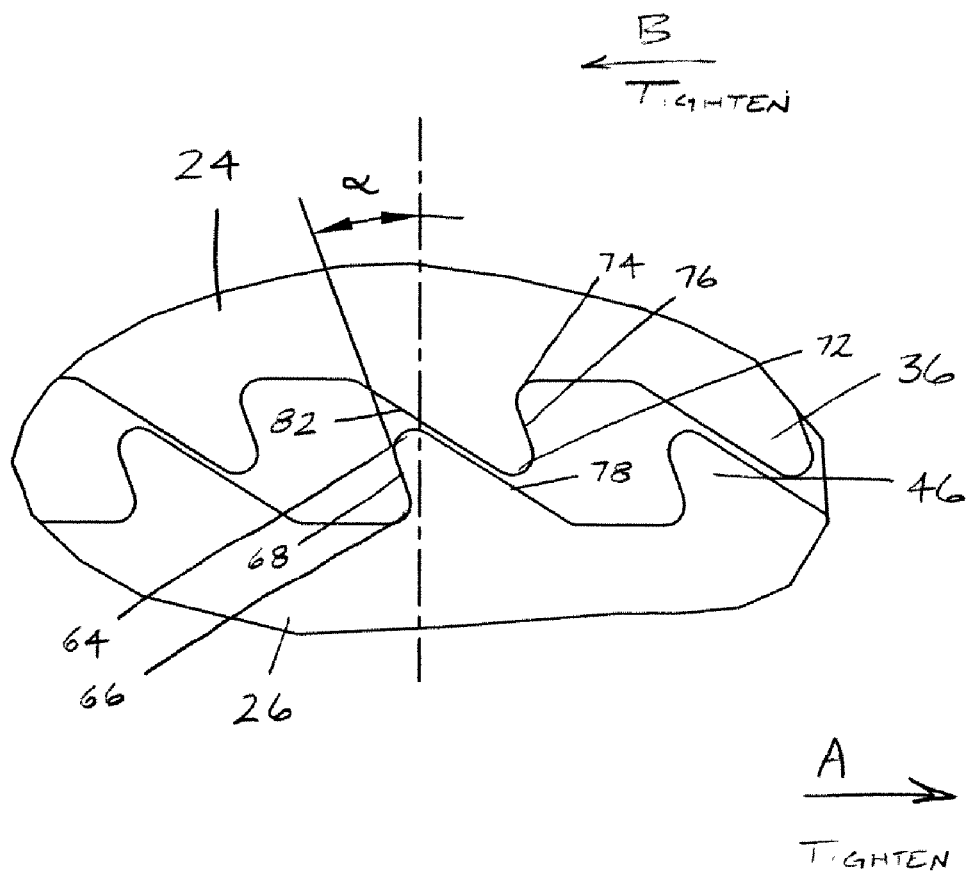
FIG. 5 is a close-up view of teeth of the locking ring riding over teeth of the nut as the locking ring is rotated in relation to the nut, or vice versa.

The self-locking characteristics of the fastener assembly will be described in more detail. The nut locking assembly 12 is threaded onto the bolt 10 with the item to be fastened interposed between the shoulder 56 of the nut 24 and the head 18 of the bolt 10 (FIG. 1). With reference to FIG. 5, a close-up view of the cooperation between the teeth is shown. FIG. 5 represents movement of the locking ring 26 in relation to the nut 24 as the bolt 10 is tightened. As the bolt 10 is tightened, as depicted by arrow A in FIG. 5, the tabs 44 of the interlocking ring 26 engage the longitudinal grooves 22 of the bolt 10 so that the interlocking ring rotates in the direction of the arrow in FIG. 5. As the nut 24 is tightened, the nut 24 moves in the direction as depicted by arrow B.

Each tooth 36 and 46 has a negative rake in the untightening direction, which is explained below, to form a negative rake angle $\alpha$, which can be between 0°-90°, and preferably between 1°-10°. Even though the teeth 36 and 46 are depicted as having the same configurations and dimensions, the teeth 36 on the nut 24 can be shaped differently than the teeth 46 on the interlocking ring 26 and can even have a different rake angle. Providing teeth having different configurations, e.g. different rake angles, can provide relief for any debris that may gather around the teeth that might inhibit the teeth from engaging one another. As the bolt 10 is tightened, the interlocking ring 26 is rotated in a tightening rotational direction (arrow A). An apex 64, which is the outermost edge of the tooth 46, follows behind a corresponding root 66, which is where a trailing edge 68 of the tooth intersects the face 44 of the interlocking ring 26. Likewise, as the nut 24 is tightened an apex 72 of each tooth 36 on the nut 24 follows a root 74 of the corresponding tooth 36 of a trailing edge 76 (arrow B). Each tooth 46 of the interlocking ring 26 also includes an inclined leading surface 78 and likewise each tooth 36 of the nut 24 also includes an inclined leading surface 82. The biasing member 28 allows the interlocking ring 26 to rotate freely in the tightening direction without displacing material in the ring 26 or the nut 24. The interlocking ring 26 will move axially along the bolt 10 as the inclined leading surface 78 of each tooth 46 of the interlocking ring rides along the inclined surface 82 of each tooth 36 of the nut 24. After each tooth rides over a corresponding tooth, the biasing member 28 provides a constant seating pressure on the interlocking ring 26.

Figure 6:
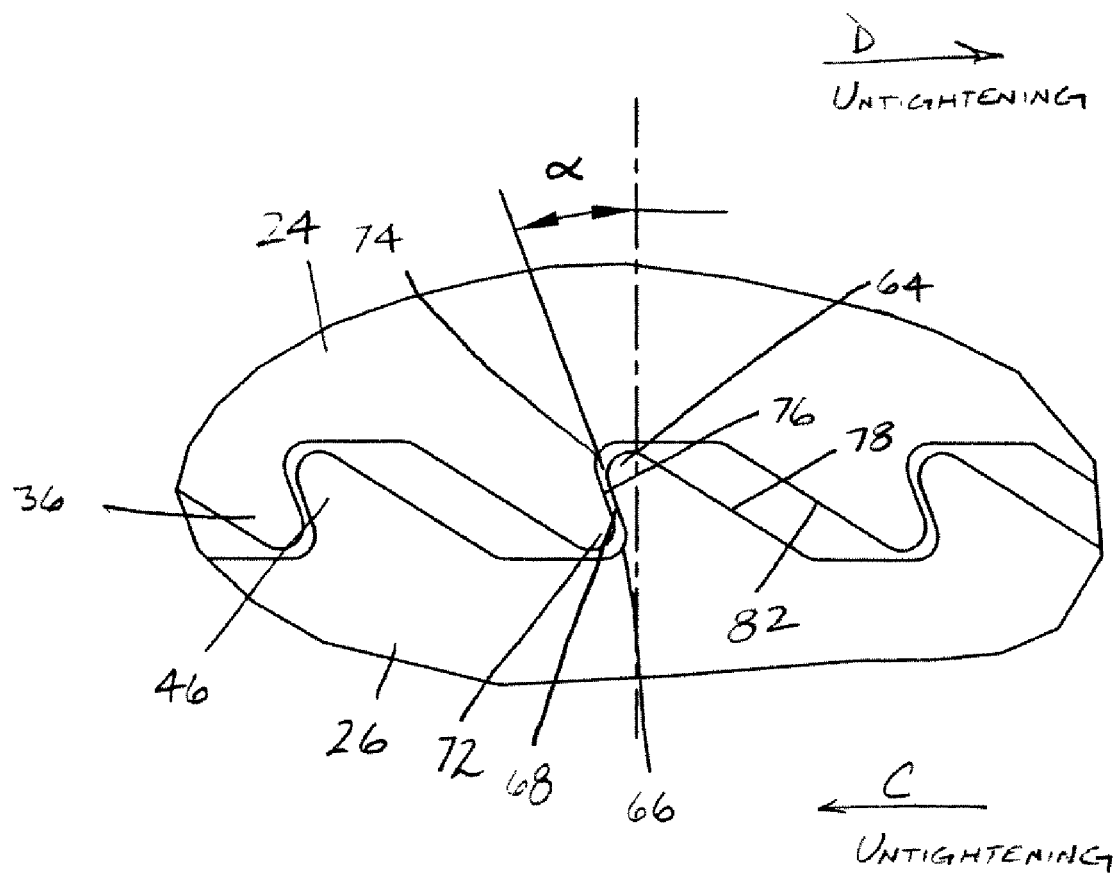
FIG. 6 is a close-up view of the teeth of a locking ring engaging the teeth of a nut of the locking nut assembly.

With reference to FIG. 6, because of the negative rake formed in the teeth 36 and 46, rotational movement in the untightening direction, as shown by arrows C and D in FIG. 6, results in the teeth 36 and 46 actively engaging one another to prohibit or substantially inhibit rotation in the untightening direction. In an attempt to untighten the bolt 10 or nut 24 the apex 64 of each tooth 46 of the interlocking ring 26 precedes the root 66 of the trailing edge 68. Likewise, the apex 72 of the trailing edge 76 precedes the root 74. Accordingly, the apex 64 of each tooth 46 of the interlocking ring 26 is encouraged to move axially towards the root 74 of each tooth 36 of the nut 24 as the bolt is rotated in an untightening rotational direction.

The forces on the trailing edge of each tooth encourage further seating of the interlocking ring and the nut. Since the teeth are formed having a negative rake, the vector component of the force on the trailing edge that is parallel to the trailing edge points downward toward the root of the tooth because the sine of a negative angle is negative.

The removal torque of the fastener assembly can be tuned through multiple methods. A first tuning method removes some of the teeth on either the locking ring or the nut. The second method is by adjusting the total shear area of the teeth.

Due to the fact that the removal torque acts on each tooth individually, the torque can be converted into a shear force that acts on a cross-sectional area of where each tooth contacts its adjoining surface, i.e. the shear force area. For the teeth on the locking ring 26, the shear force area is the area where each tooth 36 contacts the face 48. For the teeth on the nut 24, the shear force area is the area where each tooth 36 contacts the recessed face 38.

Torque is defined by the following equation:

$$T = F \times D,$$

where:
T=Torque
F=Force
D=Distance between the revolving axis of the nut or ring and the force acting on the tooth Because the force acting on each tooth is spread across its length, which is measured along the radius of the nut 24 or the interlocking ring 26, it can be assumed that the force acts at the center of each tooth. This causes the distance of the torque reaction to occur between the revolving axis of the nut or ring and the center of each tooth.

To determine the removal torque of a given tooth pattern, the following variables must be known:
G=Shear modulus of elasticity of the given material
L=Length (measured along the radius) of a given tooth where it contacts its adjoining surface
W=Width (measured along the circumference) of a given tooth where it contacts its adjoining surface
D=Distance from the revolving axis of the nut or ring to the center of the tooth
$N_t$=Total number of teeth on the nut or ring (whichever has less teeth)

First the maximum shear force, $F_{max}$, is determined by the following equation:

$$F_{max} = N_t [G(LW)]$$

The maximum removal torque, $T_{max}$, can then be calculated with:

$$T_{max} = F_{max} \times D$$

The number of teeth 36 formed on the nut 24 and the number of teeth 46 formed on the interlocking ring 26, which is controlled by the pitch, i.e. the distance between the leading edges of adjacent teeth (or the distance between the trailing edges of adjacent teeth) which is measured in degrees or radians, controls the amount of movement in the untightening rotational direction before the teeth engage one another. The greater the number of teeth either on the interlocking ring 26 or the nut 24, i.e. the smaller the pitch, the lesser the amount of rotation is allowed in the untightening rotational direction. Furthermore, the greater the number of teeth that engage one another, the more surface area is provided to counteract rotational movement in an untightening rotational direction. Accordingly, less shear force is exerted on each tooth. In the depicted embodiments, approximately forty teeth 36 are formed in the nut 24 and approximately fifty teeth 46 are formed on the interlocking ring 26, and the number of teeth may likely be a function of the diameter of the bolt 10 that is to be received by the locking nut assembly 12.

In the depicted embodiment, the pitch measures six degrees; however, the pitch can be up to about 10 degrees. For the depicted embodiment, six degrees of rotational movement in the untightenting direction is allowed before the teeth fully engage one another. A small pitch results in the bolt 12 still carrying its tensile load after one has attempted to remove the nut 24 from the bolt 12. The pitch can be lessened, especially for larger diameter fastener assemblies to allow for even less rotational movement in the untightening direction.

The components of the fastener assembly can be made from a number of different manufacturing processes. Two of these processes will be described in more detail. The nut 24 and the interlocking ring 26 can be made using a powdered metal process or a metal injection molding process. By making the nut and the interlocking ring using either of these processes, the negative rake angle for the teeth can be achieved with significantly less manufacturing costs than other known processes. For example, machining a negative rake angle would require a special cutter that is shaped like the gap between adjacent teeth (either tooth 36 or 46). Each tooth would have to be individually machined and would require the use of a special indexer and a special cutter.

For both the powdered metal process and the metal injection molding process, a powdered metal is placed into a mold, either a nut mold or an interlocking ring mold. More specifically for the metal injection molding process, a binder is typically added to the powdered metal that is placed in the mold so that the metal flows similar to a plastic injection molding process. The powdered metal and/or powdered metal and binder mixture is then compressed while restricted in the mold to form a green nut or interlocking ring. The powdered metal is then sintered below the melting point of the particular metal or alloy. The sintered nut or interlocking ring is then sized to form the corresponding teeth. In such an operation, the root of each tooth is supported while a force is applied at or near the apex of each tooth to form the negative rake angle. After the sizing operation, the sintered nut or interlocking ring is again heat treated for improved strength and hardness.

Figure 7:
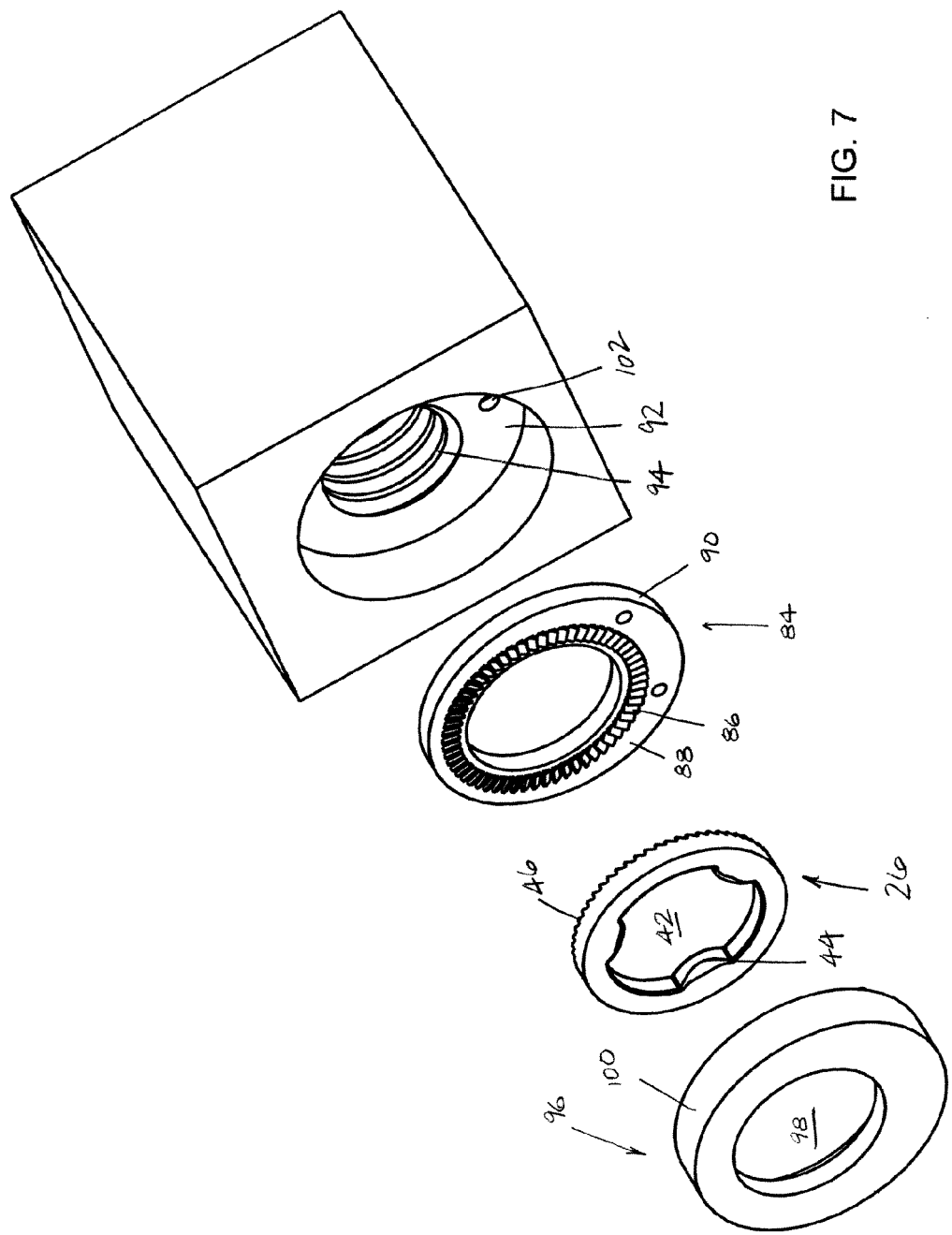
FIG. 7 is an exploded perspective view of an alternative embodiment of a fastener assembly for use with a blind hole.

With reference to FIG. 7, in another embodiment, an insert ring 84 is provided instead of the toothed face of the nut. The insert ring 84 can be made from the powdered metal process or the metal injection molding process described above. The insert ring 84 includes a plurality of teeth 86 formed on a first face 88 of the insert ring. The insert ring 84 in the embodiment depicted in FIG. 7 has a circular peripheral edge 90 that is eccentric with the opening 42 of the interlocking ring 26. The eccentric insert ring 84 is dimensioned to be received inside an eccentric counterbore 92 that leads to a threaded receptacle 94 that is concentric with the opening 42. The threaded receptacle 94 is similar to the threaded bore 32 described with reference to FIGS. 3 and 4. The eccentric counterbore 92 is similar to the counterbore 34 of the nut 24, with the exception that its periphery is eccentric with the threaded receptacle 102.

The locking ring 26, which has been described above, can be used with the insert ring 84. Also, a biasing member 96 similar to the biasing member 28 described with reference to FIGS. 3 and 4, can also be used. The biasing member 96 includes an opening 98 that is dimensioned to receive a bolt, such as the bolt 10 and is concentric with the openings 42 and 94. The biasing member also has an eccentric circular peripheral edge 100 that is dimensioned to be received inside the eccentric counterbore 92.

The eccentric peripheral edge 90 of the insert ring 84 and the eccentric configuration of the counterbore 92 inhibits or prohibits rotation of the insert ring 84 inside the counterbore 92 as the bolt is tightened into the threaded receptacle 94. The teeth 46 of the interlocking ring 26 and the teeth 86 of the insert ring 84 cooperate with one another similar to the nut locking assembly described with reference to FIGS. 3 and 4. The eccentric peripheral edge 100 of the biasing member 96 also prohibits or substantially inhibits the biasing member from rotating inside the counterbore 92. In an alternative embodiment, the eccentric peripheral edges 90 and 100 and the counterbore 92 can be made noncircular so that the biasing member 96 and the insert ring 90 do not rotate in the counterbore as the bolt 12 is tightened into the threaded receptacle 94.

Figure 8:
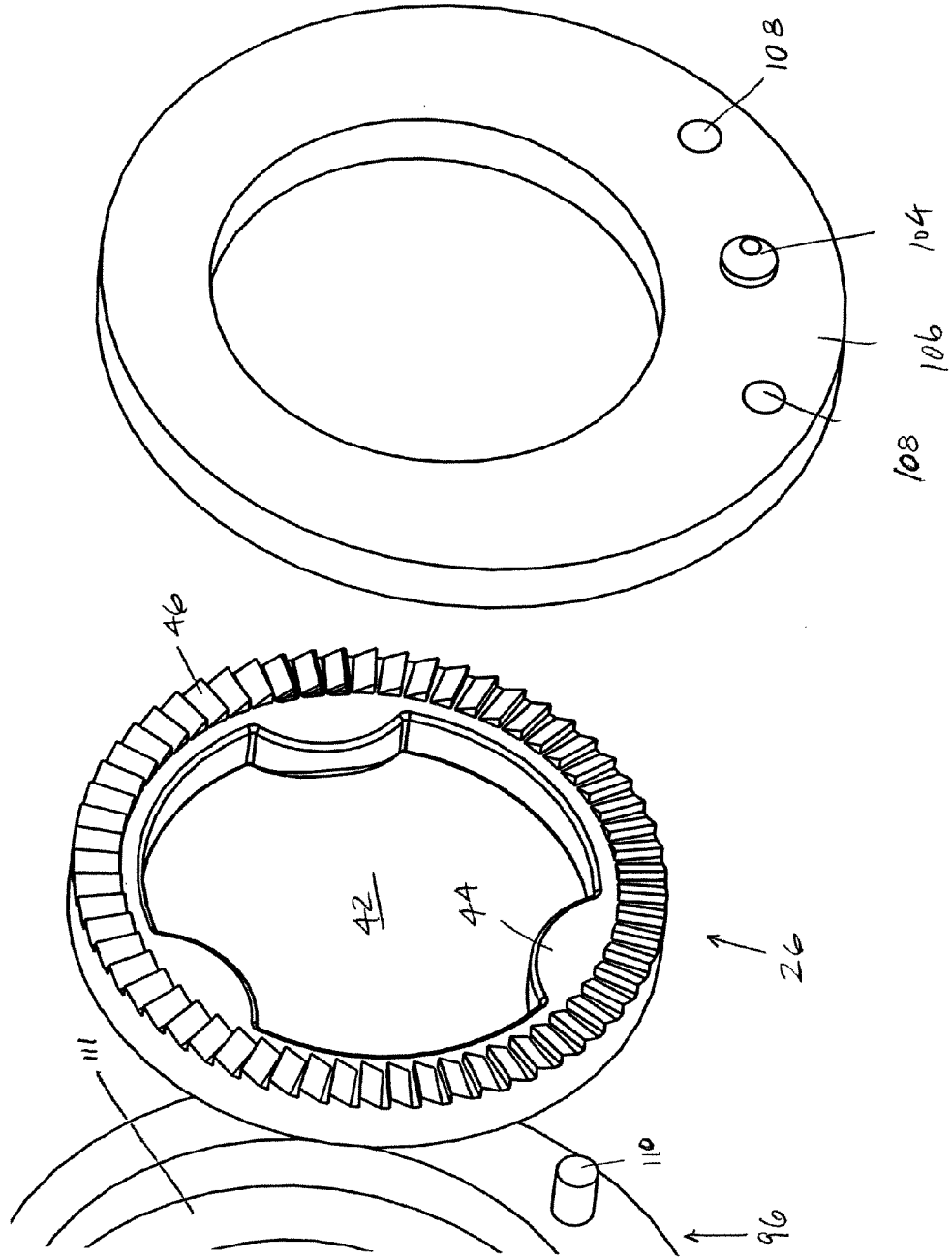
FIG. 8 is a perspective view, opposite the view depicted in FIG. 7, of a portion of the fastener assembly depicted in FIG. 7.

As seen in FIG. 7, an alignment hole 102 is formed in the counterbore 92. With reference to FIG. 8, a small protuberance 104 extends from a second face 106 of the insert ring 84, the second face being opposite the first face 88 having the teeth 86. The small protuberance 104 fits into the opening 102 to align the insert ring. The insert ring 84 also includes two through bores 108, one on each side of the protuberance 104. The biasing member 96 includes two small posts 110 that are received inside the through bores. Accordingly, the interlocking ring 26 can be received inside a circular recess 111 (only partially shown) and sandwiched between the biasing member 96 and the insert ring 84 and all three pieces can be inserted together into the counterbore 92.

Figure 9:
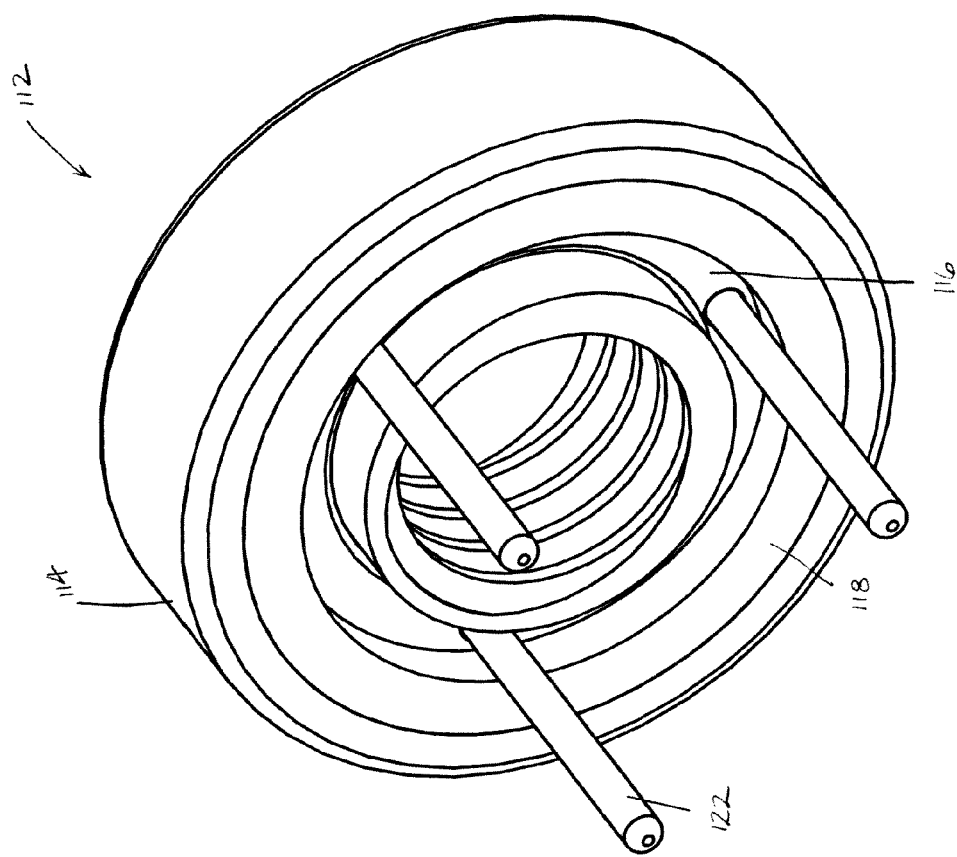
FIG. 9 is a perspective view of a removal tool for removing the locking nut assembly of FIG. 2 from the bolt shown in FIG. 1.
Figure 10:
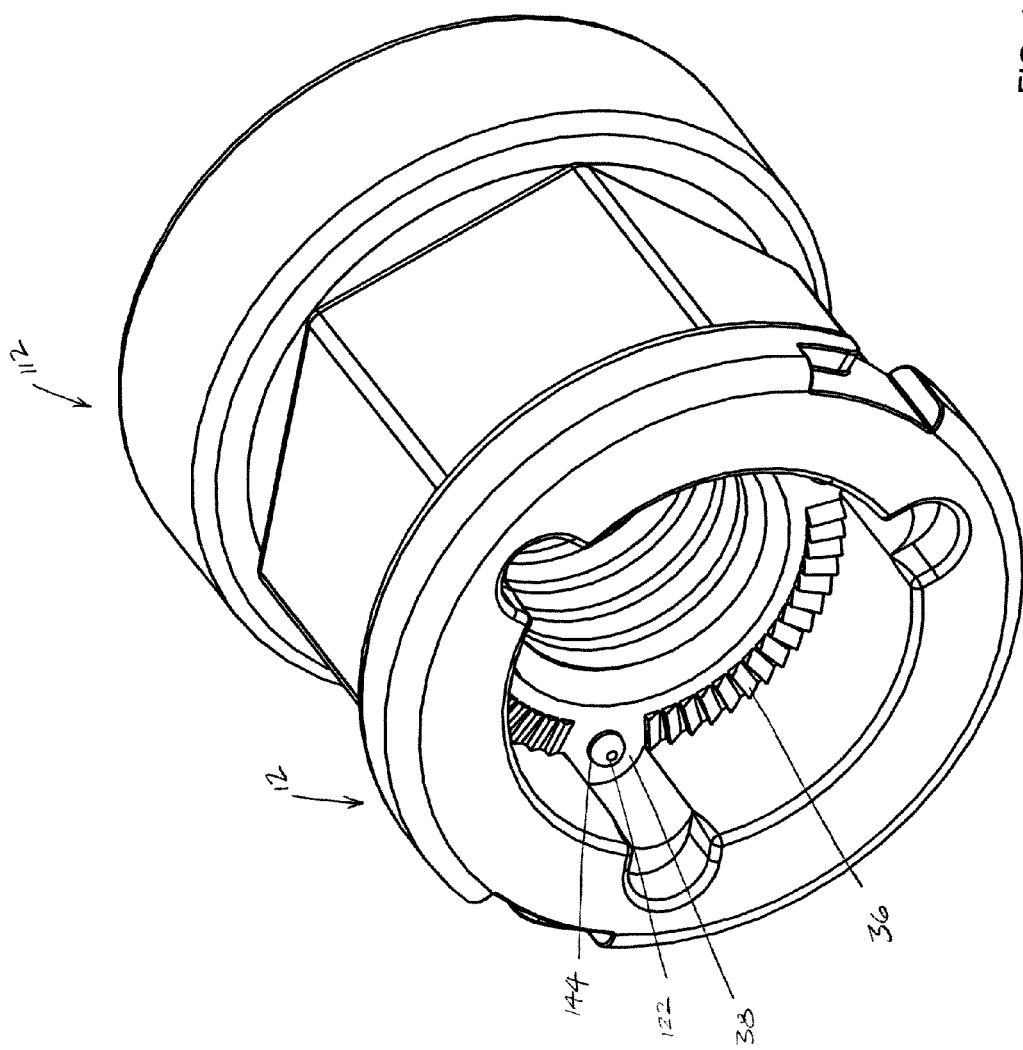
FIG. 10 is a perspective view of the removal tool cooperating with a nut of the locking nut assembly shown in FIG. 2.
Figure 11:
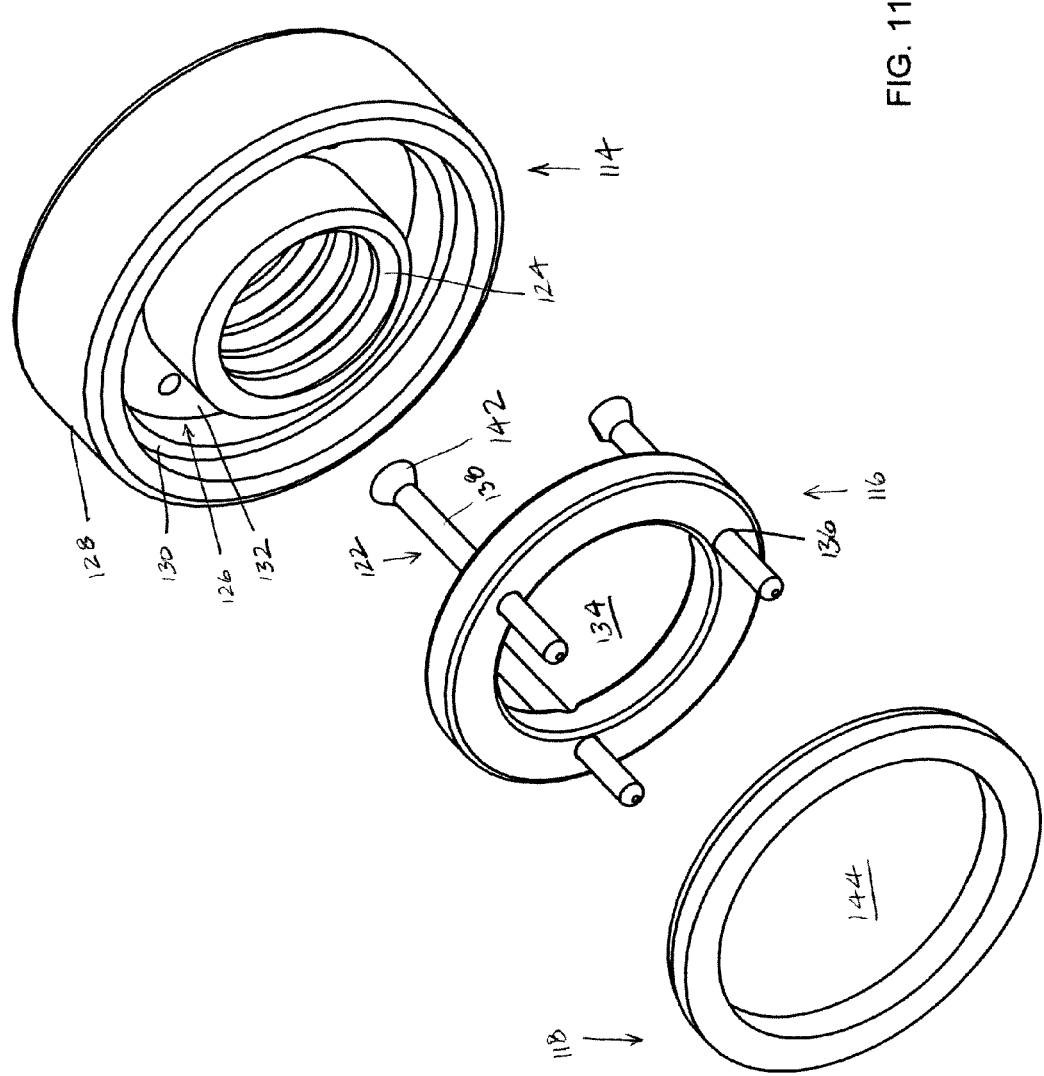
FIG. 11 is an exploded perspective view of the removal tool of FIG. 9.

FIGS. 9-11 disclose a tool that can be used to remove the nut locking assembly 12 from the bolt 10 without having to shear the teeth 36 and 46 in the nut locking assembly. The removal tool 112 includes a pin retainer 114, a pin holder 116, a retainer ring 118, and a plurality of pins 122. The removal tool 112 cooperates with the nut locking assembly 12, as seen in FIG. 10, in a manner which will be described in more detail below.

With reference to FIG. 11, the pin retainer 114 includes a threaded boss 124 that is adapted to threadingly engage the bolt 10 (FIG. 1). The pin retainer 114 includes a circular channel 126 defined between the threaded boss 124 and an outer peripheral wall 128 of the pin retainer. The circular channel is dimensioned to receive the pin holder 116, which also has a circular ring-like configuration. The pin retainer 114 also includes an annular shoulder 130 that is axially spaced from a base wall 132 of the pin retainer 114. In the depicted embodiment, the annular shoulder 130 is spaced from the base wall 132 a dimension that is equal to the thickness of the pin holder 116. The retainer ring 118 is received on the annular shoulder 130 to retain the pin holder 116 inside the circular chamber 126.

The pin holder 116 includes a central opening 134 that is dimensioned to receive the threaded boss 124 so that the pin holder 116 is seated inside the circular channel 126. The pin holder 116 includes a plurality of axially aligned pin openings 136 that are dimensioned to receive the pins 122. Each pin 122 includes an appropriately shaped shank 138 for receipt by the pin openings 136 and a head 142 at one end of the shank. The pin openings 136 and the pin holder 116 can include a counterbore (not visible) so that the head 142 is countersunk into the pin holder 116.

The retainer ring 118 includes a central opening 144 that is dimensioned to fit around the pins 138, as more clearly seen in FIG. 8. The retainer ring 118 can attach to the annular shoulder 130 and/or side wall 128 of the pin retainer 114.

Alternatively, the retainer ring 118 can simply snugly fit inside the side wall 128 and be made of a resilient material that biases outward to retain the pin holder 116 in the circular channel 126.

With reference back to FIG. 10, the removal tool 112 is threaded onto a portion of the bolt (not shown in FIG. 10) that extends from the nut 24. The pin holder 116 is positioned inside the circular channel 126 so that the pins 122 freely rotate about a longitudinal axis of the bolt 10 (not shown in FIG. 10) as the removal tool is threaded onto the bolt. The pins 122 are then aligned with axial openings 144 formed in the nut 24, which are also visible in FIGS. 3 and 4. The removal tool 12 is then threaded onto the bolt so that the pins 122 advance through the axial openings 144 in the nut 24 until they extend from the recessed face 38 of the nut 24. The pins 122 will engage the interlocking ring 26 (not shown in FIG. 10) and overcome the biasing force of the biasing member 28 axially moving the interlocking ring away from the recessed face 38. Accordingly, the teeth 46 of the interlocking ring 26 disengage the teeth 36 of the nut 24. This allows the nut 24 to be unscrewed from the bolt 10 without any loss of material in the nut 24 or the interlocking ring 26.

Figure 12:
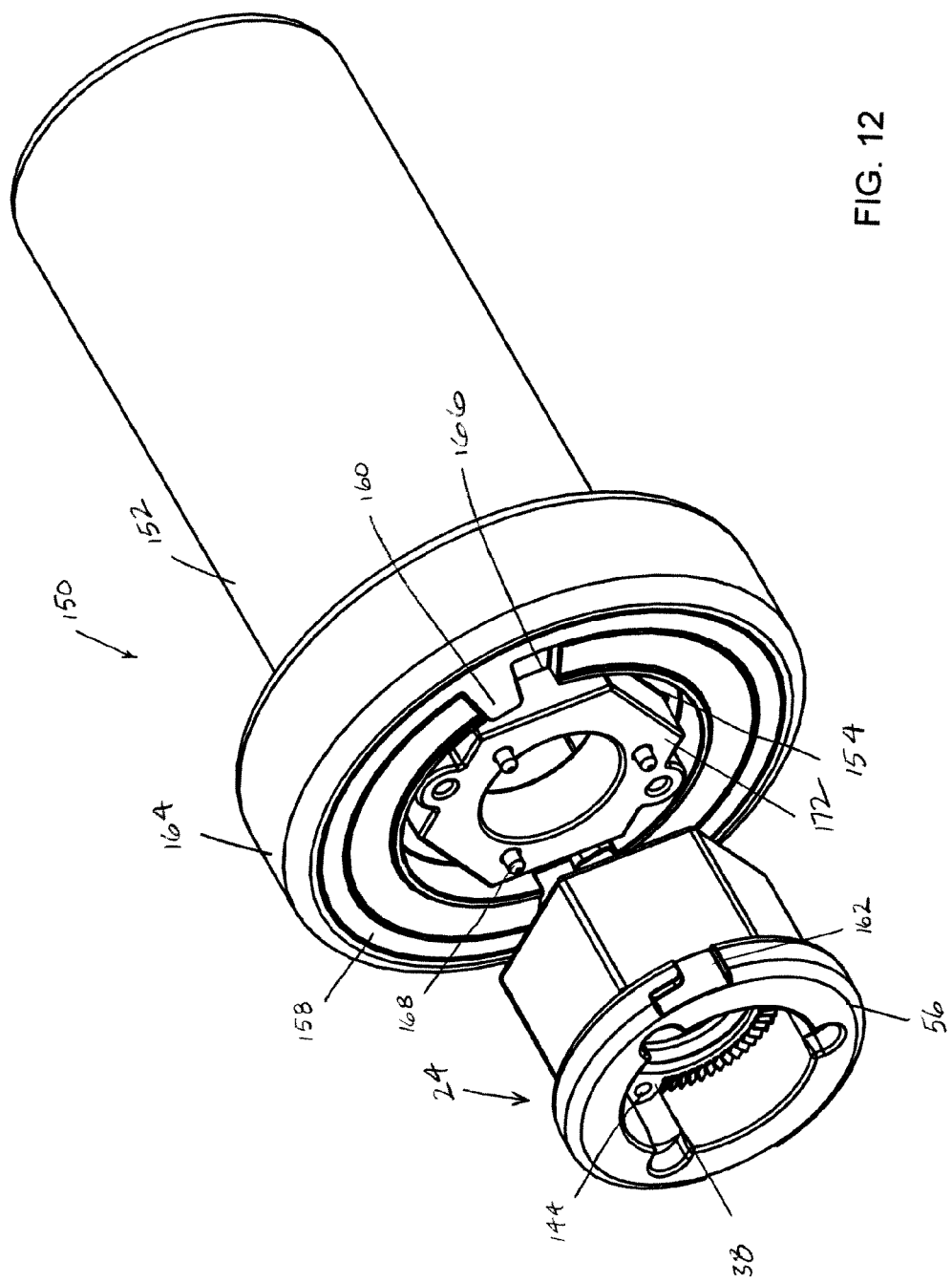
FIG. 12 is a perspective view of the nut of the locking nut assembly shown in FIG. 2 and an alternative embodiment of a removal tool.
Figure 13:
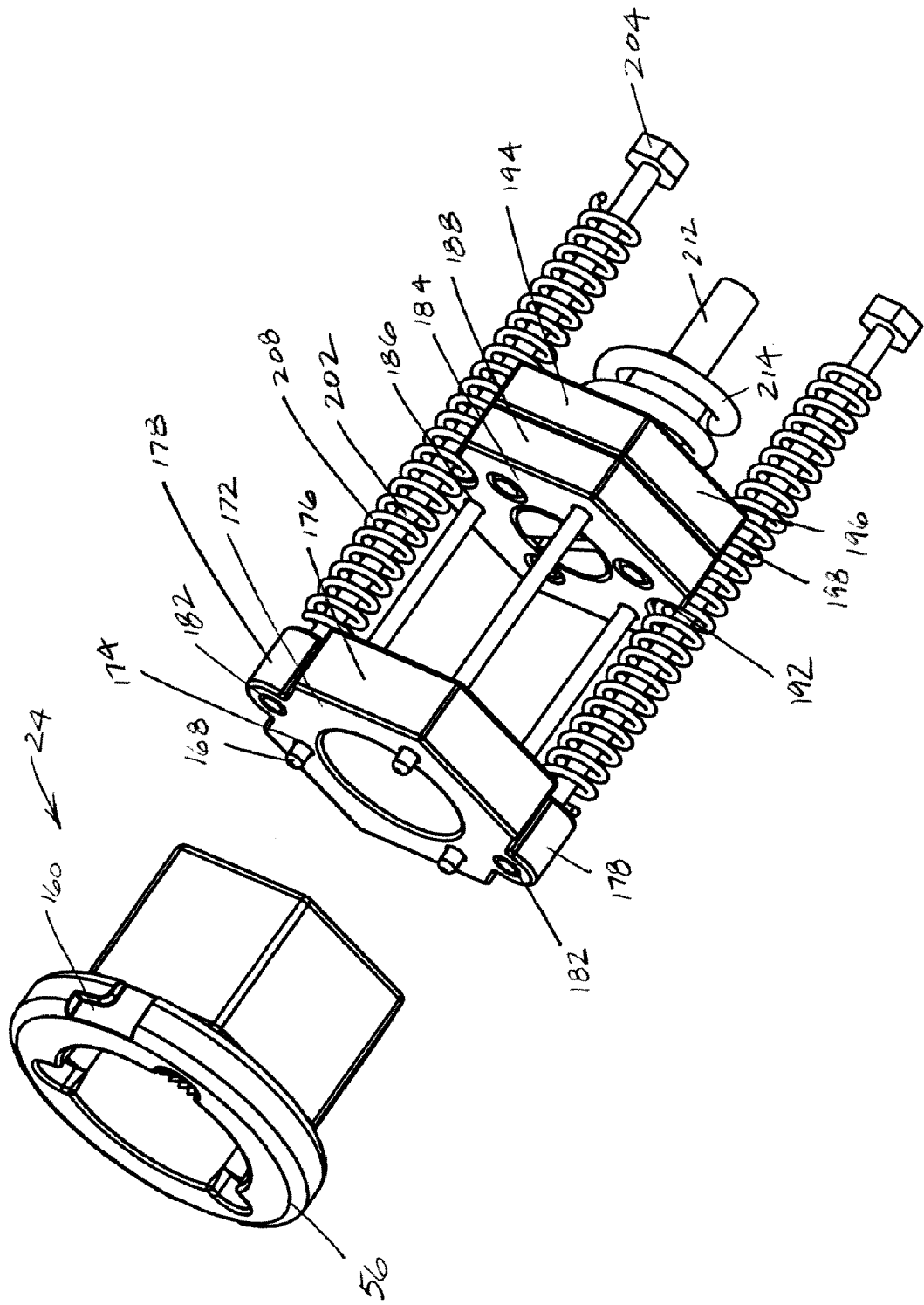
FIG. 13 is a perspective view of the removal tool of FIG. 11 with an outer housing thereof removed to show the internal components of the removal tool.
Figure 14:
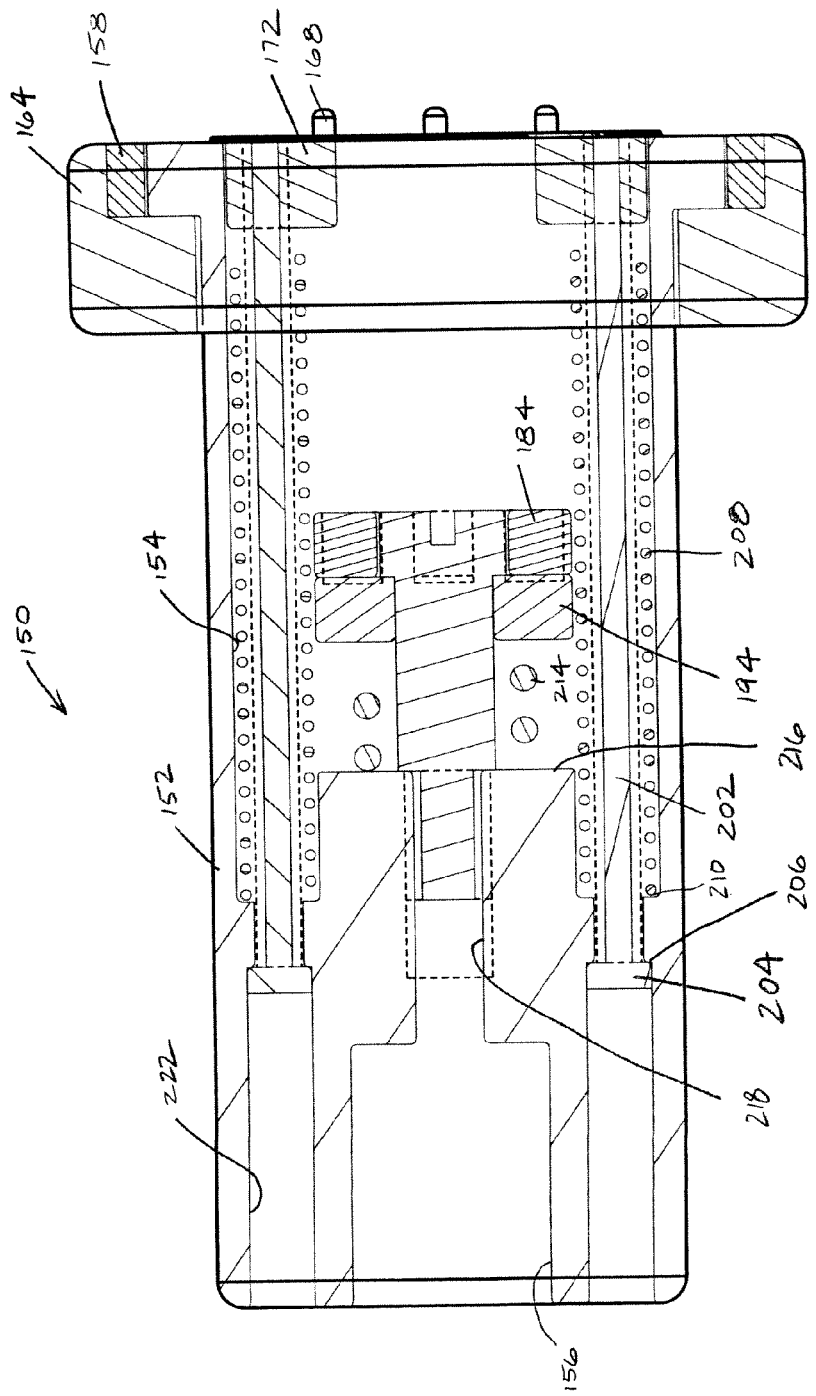
FIG. 14 is a side cross-sectional view of the removal tool depicted in FIG. 12.

With reference to FIGS. 12-14, an alternative embodiment of a removal tool 150 is shown. In this embodiment, the removal tool includes a socket 152 that includes a central opening 154 having a hexagonally shaped configuration that is adapted to receive the nut 24. The shape of the central opening 154 can be other configurations to conform to nuts having other configurations. The central opening 154 will also include notches cut out of the hexagonally shaped opening to accommodate internal components of the removal tool that will be described below. The socket 152 is adapted to work with a conventional socket wrench and can include an opening 156 (FIG. 14) at one end for receiving the socket wrench. A locking ring 158 is disposed at an end of the socket 152 where the hexagonal opening 154 terminates. The locking ring 158 includes tabs 160 that are adapted to engage L-shaped notches 162 formed on the side of the annular shoulder 56 of the nut 24. Notches 166 are formed in the socket 152 to limit the rotational movement of the locking ring 158. A retainer ring 164 retains the locking ring 158 to the socket 152.

Internal components of the removal tool 150 are housed in the socket 152. With reference to FIG. 13, the removal tool 150 includes a plurality of pins 168 that are received inside the axial bores 144 of the nut 24, similar to the pins 122 described with reference to the removal tool 112. A movable pin support 172 includes a plurality of openings 174 that receive the pins 168. The movable pin support has a hexagonally shaped peripheral edge 176 and a pair of diametrically opposed ears 178 extending from the peripheral edge 176. The ears 178 include threaded openings 182.

A pin base holder 184 supports the base of each pin 168. The pin base holder 184 includes a plurality of openings 186 dimensioned to receive the pins 168. The base pin holder 184 also includes a hexagonal peripheral edge 188 having two notches 192 that are diametrically opposed from one another and aligned with the ears 178 of the movable pin support 172. The base pin holder 184 serves a similar function as the pin holder 116 disclosed in FIGS. 9-11.

A pin base retainer 194 abuts the pin base holder 184 to retain the pins 168 in a similar manner to the pin retainer 114 disclosed with reference to FIGS. 9-11. The pin base retainer includes a hexagonal peripheral edge 196 and two notches 198 aligned with the notches 192 in the pin base holder 184. The movable pin support 172, the pin base holder 184, and the pin base retainer 194 each have a similar configuration to the polygonal configuration of the nut 24 to which the removal tool 150 will remove.

Outer threaded rods 202 are received by the threaded openings 182 in the movable pin support 172. The outer threaded rods 202 include and/or attach to heads 204 that contact a first shoulder 206 (FIG. 14) of the socket 152. Biasing members, which in this embodiment are helical springs 208, receive the outer threaded rods 202 and are disposed between the movable pin support 174 and a second radial shoulder 210 (FIG. 14), which is spaced from the first radial shoulder 206 towards the movable pin support.

A central shoulder screw 212 connects the pin base holder 184 and the pin base retainer 194. A biasing member 214, which has a greater biasing force than the helical springs 208 and the biasing member 28 for the locking nut assembly 14, biases the pin base holder 184 and the pin base retainer 194 from a central socket shoulder 216 (FIG. 14), which has a threaded opening 218 for receiving the screw 212.

To remove the nut 24, the removal tool 150 is aligned so that the pins 168 can be received in the axial bores 144 of the nut 24. The socket 152 is then pushed towards the shoulder 56 of the nut 24 and is rotated so that the tabs 160 engage in the L-shaped notches 162 of the nut 24. When the locking ring 156 is engaged with the shoulder 56 of the nut 24, the movable pin support 172 is moved towards the pin base holder 184 and the pins 168 extend from the recessed base 38 of the nut 24 to overcome the biasing member in a similar manner to the removal tool described with reference to FIGS. 9-11. The pins move axially in bores 222 (FIG. 14) formed in the socket 152. The socket 152 can then be used to remove the nut 24.

Figure 15:
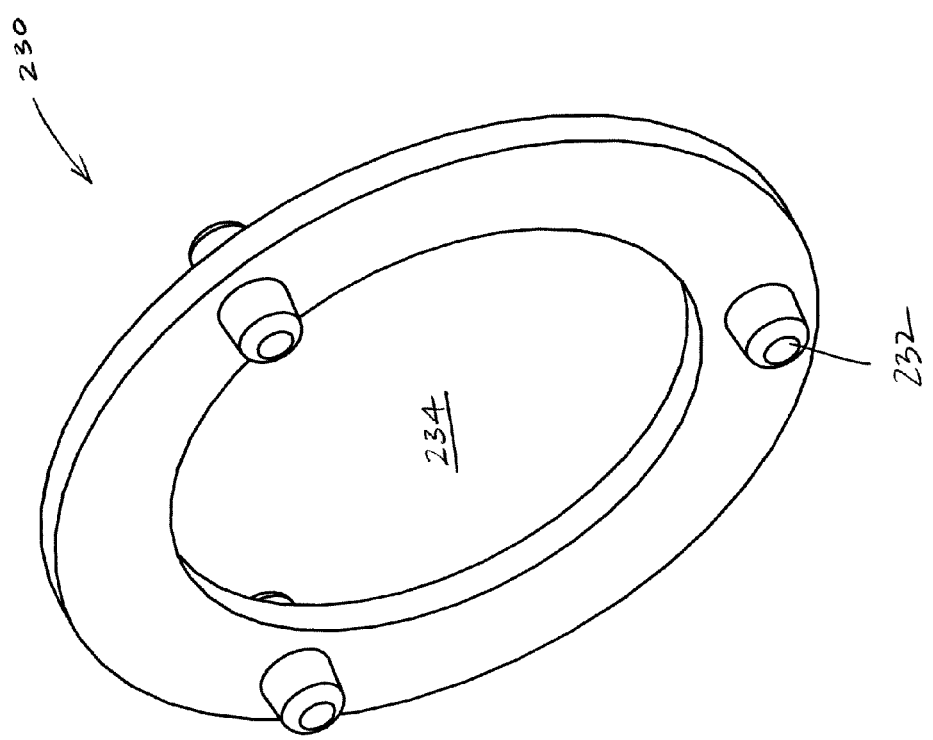
FIG. 15 is a perspective view of a cover for use with the nut of the locking nut assembly shown in FIG. 2.

With reference to FIG. 15, a cover 230 can be provided to prevent any debris from traveling through the exposed ends of the longitudinal bores 144 (FIG. 12) that receive the pins 168. The cover 230 fits on to the end of the nut 24 opposite the shoulder 56. Small protuberances 232 that are dimensioned to fit inside the ends of the bores 144 extend from a face of the cover 230. The cover 230 includes a central opening 234 that receives the bolt 12. To remove the nut 24 from the bolt 12, the cover 230 would be removed from the nut and then the removal tool 112 or 150 could be used to remove the nut.

Figure 16:
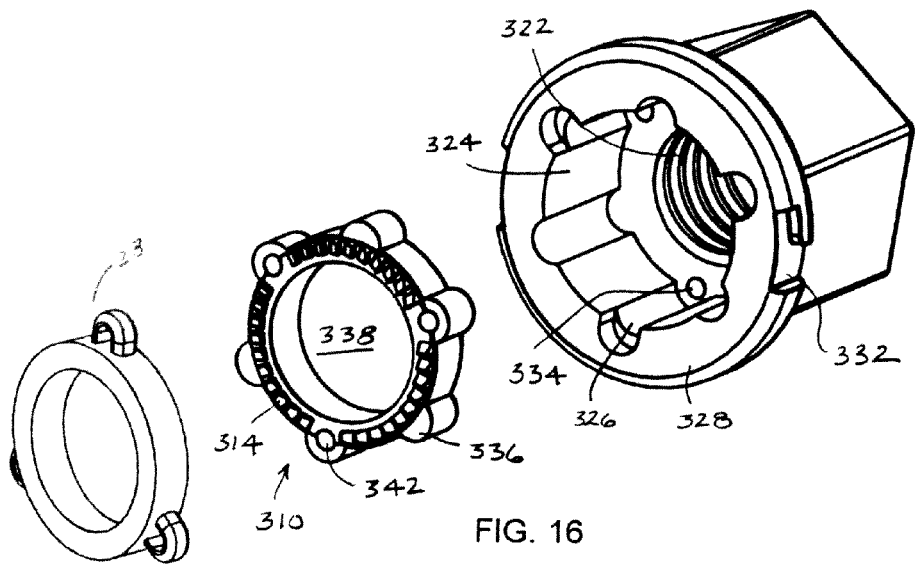
FIG. 16 is a perspective view of a nut and an insert ring removed from the nut that can thread onto the bolt shown in FIG. 1.
Figure 17:
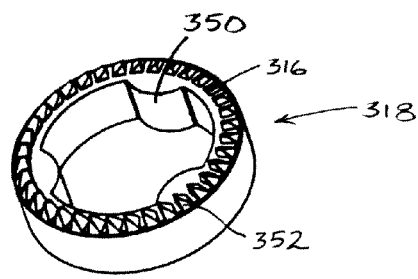
FIG. 17 is a perspective view of an interlocking ring that is received on the bolt shown in FIG. 1 and cooperates with the assembly shown in FIG. 16.

With reference to FIGS. 16 and 17, an alternative embodiment of a nut locking assembly that can cooperate with the bolt 10 shown in FIG. 1 is disclosed. Similar to the embodiment shown in FIG. 7, an insert ring 310 (similar to the nut depicted in FIGS. 1-6) provides a first plurality of teeth 314 that cooperate with a second plurality of teeth 316 formed on an interlocking ring 318. The nut 312 is very similar to the nut 24 shown in FIG. 2 in that it includes a threaded bore 322, a counterbore 324 that is coaxial with the threaded bore, a plurality of longitudinal recesses 326 offset from the threaded bore and a radial shoulder 328. L-shaped recesses 332 and smaller diameter longitudinal bores 334 that cooperate with the removal tool depicted in FIGS. 9-14 are also provided on the nut 312.

The insert ring 310 includes a plurality of outwardly extending protuberances 336 that are received in the longitudinal recesses 326 so that the insert ring 310 rotates along with the nut 312. The insert ring 310 also includes a central unthreaded opening 338 that receives the shank of the bolt 10 (FIG. 1) while allowing the threads to pass therethrough. Smaller diameter longitudinal bores 342 align with longitudinal bores 334 when the insert ring 310 is inserted into the counterbore 324 so that the removal tools described in FIGS. 9-14 can cooperate with the interlocking ring 318 in the manner that is already been described. A biasing member (not shown) similar to the biasing member 28, described above, is also received in the counterbore 324 to urge the teeth 316 toward the teeth 314. With the insert ring 310 received in the counterbore 324 of the nut 312, the insert ring 310 and the nut 312 take a very similar configuration to the nut 24 shown in FIG. 3. In view of this, with the insert ring 310 placed in the counterbore 324 of the nut 312, the two components can be thought of as a single nut or a first component of the nut locking assembly.

Figure 18:
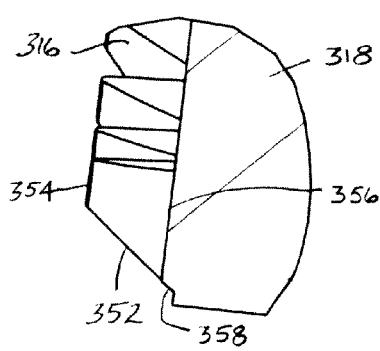
FIG. 18 is a close up side elevation view of teeth of the interlocking ring of FIG. 17.
Figure 19:
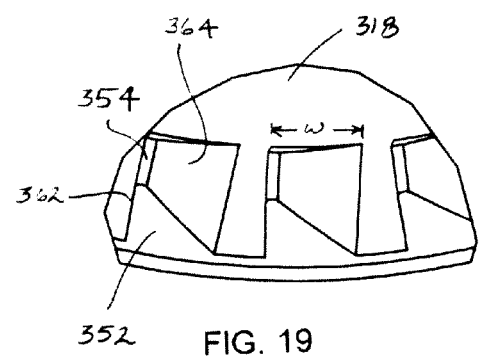
FIG. 19 is a close up plan view of the teeth of the interlocking ring of FIG. 17.

The interlocking ring 318 includes the plurality of teeth 316 and a plurality of inwardly protruding tabs 350 that are received in a longitudinal grooves 22 (FIG. 1) of the bolt 10. With reference to FIG. 18, the teeth 316 of the locking ring 318 are shown in more detail. Each tooth 316 includes a chamfered outer edge 352. The chamfered outer edge 352 extends from an apex 354 through the base 356 of the tooth 316 to define a circular (in plan view) cutout 358 in the locking ring 318. A trailing edge 362 of each tooth (with reference to the tightening rotational direction) that is disposed at a zero degree or negative rake angle. A leading edge 364 (with reference to the tightening rotational direction) is inclined toward the apex 354. The base 456 of each tooth 316 has a substantially rectangular configuration so that at each cross section taken through the teeth 316 (and 314) normal to the intersection of the trailing edge 362 (or the leading edge 364) at the base 356 in the width dimension w is substantially constant throughout these cross sections from an inner diameter to an outer diameter. The substantially constant cross section allows the height h of each tooth to remain constant from an outer diameter to an inner diameter of the teeth (excluding the chamfered portion). This allows more full face-to-face contact of the teeth 314 of the insert ring 310 to engage the teeth 316 of the inner locking ring 318 when one is rotated in an untightening direction as compared to teeth that are radially cut (radially cut teeth having a more pie-shaped configuration in plan view). The teeth 314 for the insert ring 310 take a similar configuration to the teeth 316 for the locking ring 318.

With reference to FIG. 20, a schematic depiction of the insert ring 310 attempting to be backed off (untightened) from the interlocking ring 318 is shown. FIG. 21 shows a plan view of FIG. 20 with the teeth shown in phantom. With reference to FIGS. 22-24 it is apparent that the height of each tooth 314 and 316 remains constant from an inner diameter to an outer diameter. Also, the trailing edge 362 of the interlocking ring teeth 316 fully engage the trailing edge 372 of the insert ring 310 at all points along the cross section. The full face contact is a function of the root 374 of the trailing edge 362 being offset from of the rotational axis 376 for both the insert ring 310 and the interlocking ring 318. The root 378 of the trailing edge 372 of the insert ring teeth 314 is also offset from the rotational axis for full face contact. The offset for each equals (2×Tan (rake angle))÷height of tooth h. The base of each tooth also has a constant cross section from an outer diameter to the inner diameter of each tooth.

The advantages of the rectangular base and the offset of the root of the trailing edge of each tooth from the rotational axis of the rings becomes more apparent by comparing the cross section shown in FIGS. 22-24 to known fastener assemblies. FIG. 25 depicts a plan view of a ring 410 having a plurality of radially cut teeth 412, i.e. the leading edges and the trailing edges each aligned with the radius of the rotational axis. In FIG. 26, the teeth are radially cut in that the root of the leading edge 414 and the root of the trailing edge 416 both follow a line that intersects the rotational axis 418 of the ring. Also noticeable in FIG. 26, the apex 420 of each tooth is aligned with the axis of rotation 418.

FIG. 27 depicts two rings on top of one another engaging one another with only one tooth of each ring shown in hidden lines for clarity. As more clearly seen in FIGS. 28-32, due to the negative rake of the trailing edges 416 and the of the teeth 412 of the lower ring 410 being aligned with the rotational axis 418, the trailing edge 422 upper teeth 424 of the upper ring 426 engage the trailing edge 416 the lower teeth 412 of the lower ring 410 at the outer diameter (see FIG. 28) when being untightened, but the teeth 412 and 424 do not engage one another at the cross sections that are radially inward from the outer diameter (see FIGS. 29-32). Additionally, a drop in tooth height is also apparent and this is due to the close pitch of the teeth (12 degrees in this instance) and the fact that the teeth are radially cut. The flawed line of contact occurs because to form the teeth a portion of the adjacent tooth must be removed from the preceding tooth as the next tooth is cut.

FIGS. 34-40 depict an alternative embodiment where the teeth of the rings are radially cut, but the apex and root of each tooth is offset from the rotational axis of the respective ring. FIG. 33 depicts a plan view of a ring 450, which can be similar to the insert rings or the interlocking rings described above, where the ring includes a plurality of teeth 452. FIG. 35 depicts a second ring 454 disposed on top of the first ring 450 with the teeth shown in hidden lines. FIGS. 36-40 depict the teeth 452 of the lower ring 450 engaging the teeth 456 of the upper ring 454. The apex 458 and the root 462 of the lower tooth 452 and the apex 464 and the root 466 of the upper tooth 456 are both offset from the rotational axis 470 of both rings. The trailing edges 472 and 474 are disposed at a negative rake angle. When being untightened, the trailing edge 472 of the lower tooth 452 contacts the trailing edge 474 of the upper tooth 456 at each cross section taken from the outer diameter through to the inner diameter. The tooth height drops because of the close pitch, nevertheless, this is an improvement over the known designs depicted in FIGS. 25-32.

A self-locking fastener assembly has been described with reference to specific embodiments. Modifications and alterations will occur to those upon reading and understanding the preceding detailed description. The invention is not limited to only those embodiments described above. Instead, the invention is intended to cover all modifications and alterations that come within the scope of the appended claims and the equivalents thereof.

The invention claimed is:

1. A fastener assembly comprising:
   a threaded bolt including a groove formed in threads of the bolt extending in a direction parallel to the rotational axis of the bolt;
   a nut including a threaded bore for threading the nut onto the bolt and a plurality of nut teeth formed on a face around the threaded bore and protruding from the face in a direction parallel to a rotational axis of the nut, at each cross section taken through each nut tooth normal to a radius emanating from the nut's rotational axis each intersection of a nut tooth trailing edge and the face being offset an equal distance from the radius in a direction perpendicular to the radius and each nut tooth trailing edge being disposed at a rake angle less than 0°;
   a locking ring including a locking ring bore, an inward extending tab received in the groove of the bolt and a plurality of locking ring teeth formed on a surface around the locking ring bore for engaging the nut teeth, the locking ring teeth protruding from the surface in a direction parallel to a rotational axis of the locking ring, at each cross section taken through the locking ring teeth normal to a radius emanating from the locking ring's rotational axis each intersection of a locking ring tooth trailing edge and the surface being offset an equal distance from the radius in a direction perpendicular to the radius and each locking ring tooth trailing edge being disposed at a rake angle less than 0°; and
a biasing member biasing the nut towards the locking ring.

2. The assembly of claim 1, wherein the biasing member comprises a ring made from an elastomeric material.

3. The assembly of claim 1, wherein the nut includes a first component having a counterbore coaxial with the threaded bore, a polygonal outer periphery in a cross section taken normal to the nut's rotational axis and a ring received in the counterbore, the ring including the face on which the teeth are formed.

4. The assembly of claim 1, wherein each nut tooth trailing edge is spaced less 10° from each adjacent nut tooth trailing edge.

5. The assembly of claim 1, wherein each locking ring tooth trailing edge is spaced less 10° from each adjacent locking ring tooth trailing edge.

6. The assembly of claim 1, wherein each nut tooth includes a chamfered outer edge.

7. The assembly of claim 6, wherein each locking ring tooth includes a chamfered outer edge.

8. A fastener assembly comprising:
a threaded bolt including a longitudinal groove;
a nut including a threaded bore for threading the nut onto the bolt, a counterbore coaxial with the threaded bore and a longitudinal recess radially offset from the counterbore;
a first ring received in the counterbore including a longitudinal protuberance received in the longitudinal recess, a first ring bore extending through the first ring and a plurality of first teeth formed on a face around the first ring bore and protruding from the face in a direction parallel to a rotational axis of the first ring, at each cross section taken through each first tooth normal to a first ring radius emanating from the first ring's rotational axis each intersection of a first ring tooth trailing edge and the face being offset an equal distance from the first ring radius in a direction perpendicular to the first ring radius, each first tooth trailing edge being disposed at a rake angle less than or equal to 0° and each first tooth including an outer chamfered edge;
a second ring received in the counterbore and including a second ring bore extending through the second ring, an inward extending tab received in the groove of the bolt and a plurality of second teeth formed on a surface around the second ring bore for engaging the first ring teeth, the second ring teeth protruding from the surface in a direction parallel to a rotational axis of the second ring, at each cross section taken through the second ring teeth normal to a second ring radius emanating from the second ring's rotational axis each intersection of a second ring tooth trailing edge and the surface being offset an equal distance from the second ring radius in a direction perpendicular to the second ring radius and each second ring tooth trailing edge being disposed at a rake angle less than or equal to 0°, each second tooth including an outer chamfered edge; and
a biasing member biasing the second ring towards the first ring.

9. A fastener assembly comprising:
a threaded bolt including at least one groove formed in threads of the bolt extending in a direction parallel to the rotational axis of the bolt;
a nut including a threaded bore for threading the nut onto the bolt and a counterbore for housing an insert ring;
the insert ring comprising a plurality of insert ring teeth formed on a face around the insert ring and protruding from the face in a direction parallel to a rotational axis of the insert ring, at each cross section taken through each insert ring tooth normal to a radius emanating from the insert ring's rotational axis each intersection of a insert ring tooth trailing edge and the face being offset an equal distance from the radius in a direction perpendicular to the radius and each insert ring tooth trailing edge being disposed at a rake angle less than or equal to 0°;
a locking ring including a locking ring bore, an inward extending tab received in the groove of the bolt and a plurality of locking ring teeth formed on a surface around the locking ring bore for engaging the nut teeth, the locking ring teeth protruding from the surface in a direction parallel to a rotational axis of the locking ring, at each cross section taken through the locking ring teeth normal to a radius emanating from the locking ring's rotational axis each intersection of a locking ring tooth trailing edge and the surface being offset an equal distance from the radius in a direction perpendicular to the radius and each locking ring tooth trailing edge being disposed at a rake angle less than or equal to 0°; and
a biasing member biasing the nut towards the locking ring.

10. A fastener assembly of claim 9 wherein the insert ring comprises a plurality of outwardly extending protuberances adapted to be received in a plurality of longitudinal recesses located within the nut to allow the insert ring to rotate along with the nut.

11. A fastener assembly of claim 9 wherein a base of each of the plurality of insert ring teeth and the plurality of locking ring teeth comprise a substantially rectangular configuration.

12. A fastener assembly of claim 11 wherein a width dimension of the base of each of the plurality of insert ring teeth and the plurality of locking teeth is substantially constant from an inner diameter to an outer diameter.

13. A fastener assembly of claim 12 wherein a height dimension of the plurality of insert ring teeth and the plurality of locking teeth is substantially constant from the inner diameter to the outer diameter.

* * * * *